Nov. 3, 1953 C. W. BRUFFEY 2,657,502
APPARATUS FOR RAISING AND SUPPORTING A LAWN MOWER
AND, INCLUDING BLADE SHARPENING MEANS
Filed April 28, 1950 4 Sheets-Sheet 1

Carroll W. Bruffey
INVENTOR.

BY *Clarence A. O'Brien
and Harvey B. Jacobson*
Attorneys

Nov. 3, 1953  C. W. BRUFFEY  2,657,502
APPARATUS FOR RAISING AND SUPPORTING A LAWN MOWER
AND, INCLUDING BLADE SHARPENING MEANS
Filed April 28, 1950  4 Sheets-Sheet 2
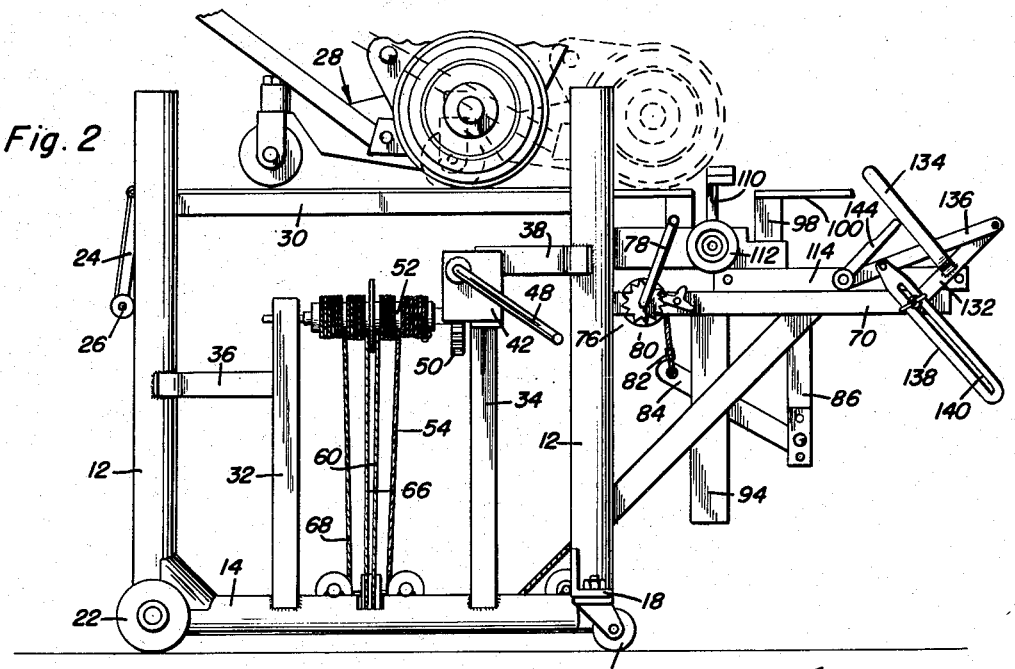
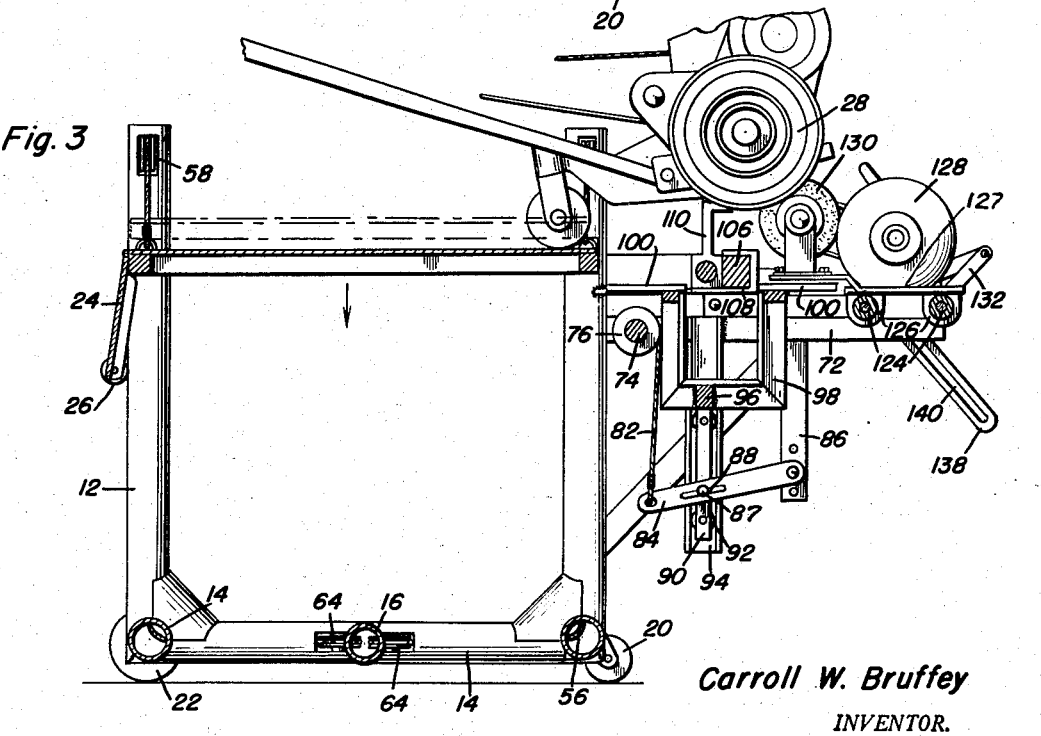
Carroll W. Bruffey
INVENTOR.

Nov. 3, 1953     C. W. BRUFFEY     2,657,502
APPARATUS FOR RAISING AND SUPPORTING A LAWN MOWER
AND, INCLUDING BLADE SHARPENING MEANS
Filed April 28, 1950     4 Sheets-Sheet 3

Carroll W. Bruffey
INVENTOR.

Nov. 3, 1953           C. W. BRUFFEY           2,657,502
APPARATUS FOR RAISING AND SUPPORTING A LAWN MOWER
AND, INCLUDING BLADE SHARPENING MEANS
Filed April 28, 1950           4 Sheets-Sheet 4

Carroll W. Bruffey
INVENTOR.

Patented Nov. 3, 1953

2,657,502

UNITED STATES PATENT OFFICE 2,657,502

APPARATUS FOR RAISING AND SUPPORTING A LAWN MOWER AND INCLUDING BLADE SHARPENING MEANS

Carroll W. Bruffey, Charlottesville, Va.

Application April 28, 1950, Serial No. 158,764

8 Claims. (Cl. 51—34)

This invention relates to a lawn mower lift and has for its primary object to provide a device which will easily and readily raise a lawn mower or like tool into position so that the blades thereof may be sharpened.

Another object of this invention is to provide a device on which a lawn mower may be supported in a convenient position in order that the cutting blades thereof may be readily sharpened by a grinder or like tool.

A further object of this invention is to provide means associated with the means for raising the lawn mower and supporting it in position for enabling a grinder or like tool to be readily and adjustably supported thereon so that it may be readily brought into engagement with the cutting edges of a lawn mower or like garden implement.

Still another object of this invention is to provide means for positioning a lawn mower upon a supporting element, which means consists of a platform which may be readily lowered out of the way.

A further object of this invention is to provide a pair of vertically adjustable platforms on which the lawn mower may be first raised to position and then placed in position which platforms may be readily lowered so as to leave the lawn mower in a desired position at a predetermined angle so that a grinder or like instrument may be readily brought into play and thus the cutting blades of the lawn mower or like farm implement may be sharpened.

Still further objects reside in the provision of a lawn mower lift that is strong, durable, highly efficient in operation, comparatively simple in construction and manufacture, capable of being made from various stock parts, which may be moved from one location to another, and which is comparatively simple to operate.

These, together with the various ancillary objects of the invention which will become apparent as the following description proceeds, are attained by this lawn mower lift, a preferred embodiment of which has been illustrated in the accompanying drawings, by way of example only, wherein:

Figure 2 is a side elevational view similar to the view shown in Figure 1 after the lawn mower has been raised to another position;

Figure 3 is a vertical sectional view of the lawn mower lift showing the lawn mower in a supported position on the device preparatory to the application of the grinder to the cutting blades;

Figure 1:
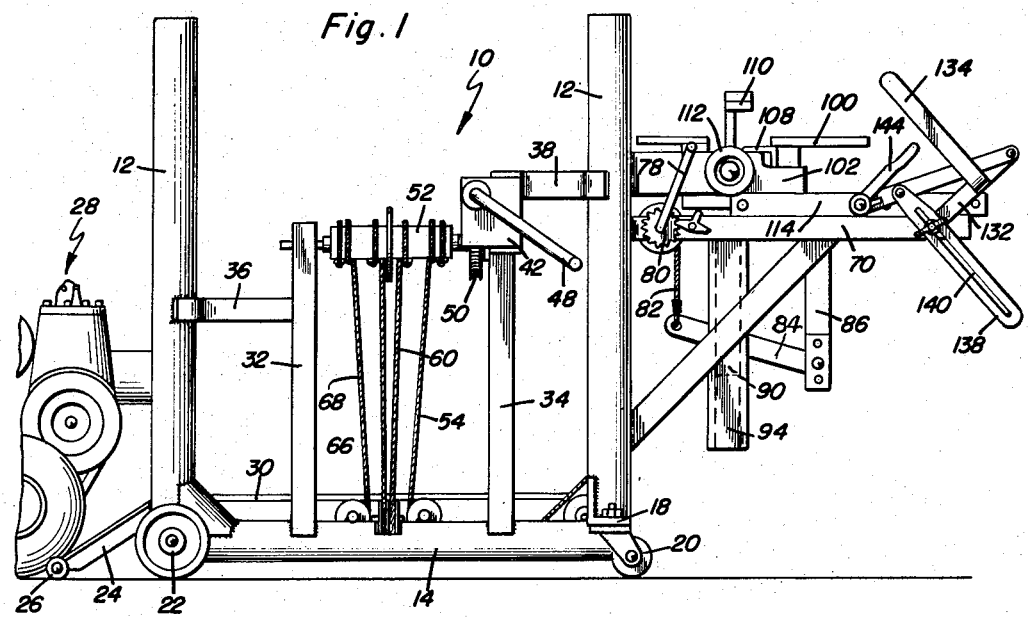
Figure 1 is a side elevational view of the lawn mower lift shown in an initial position prior to the loading of a lawn mower thereupon.
Figure 8:
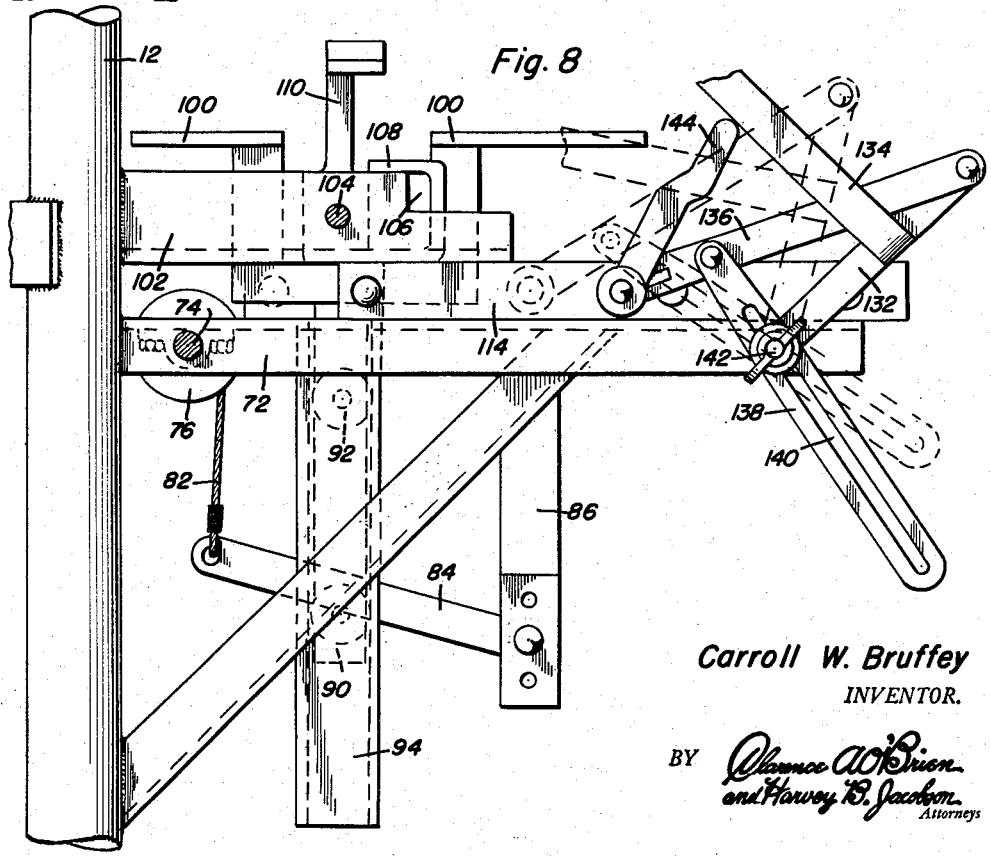
Figure 4:
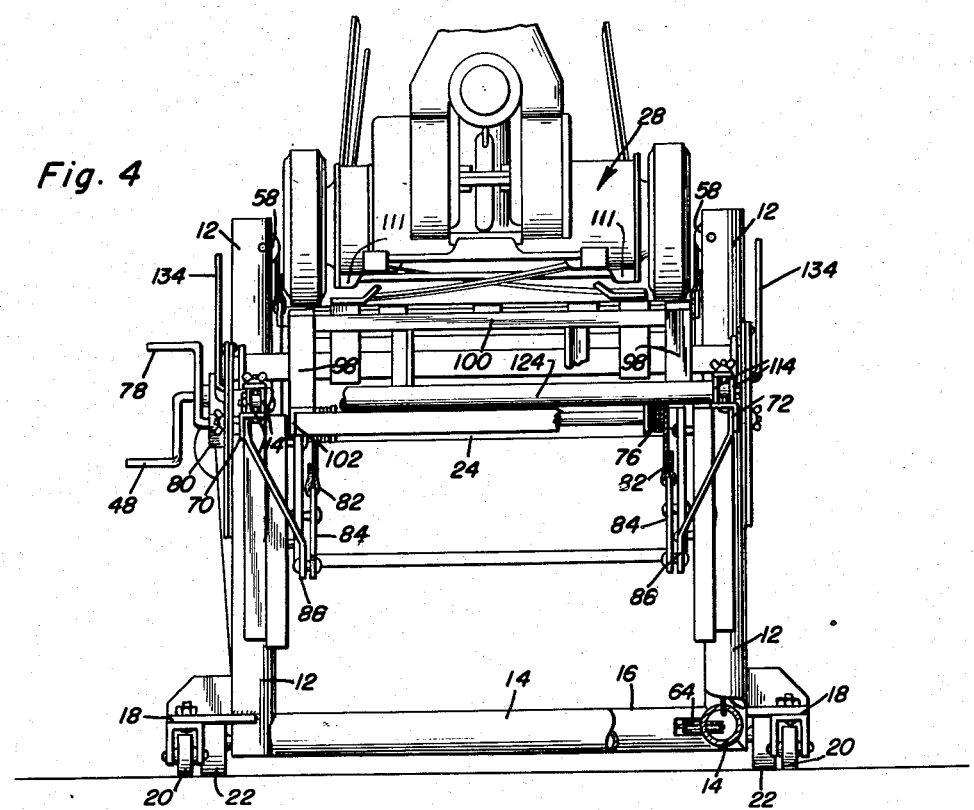
Figure 4 is an end elevational view of the invention with parts thereof being broken away to show other parts in section.
Figure 7:
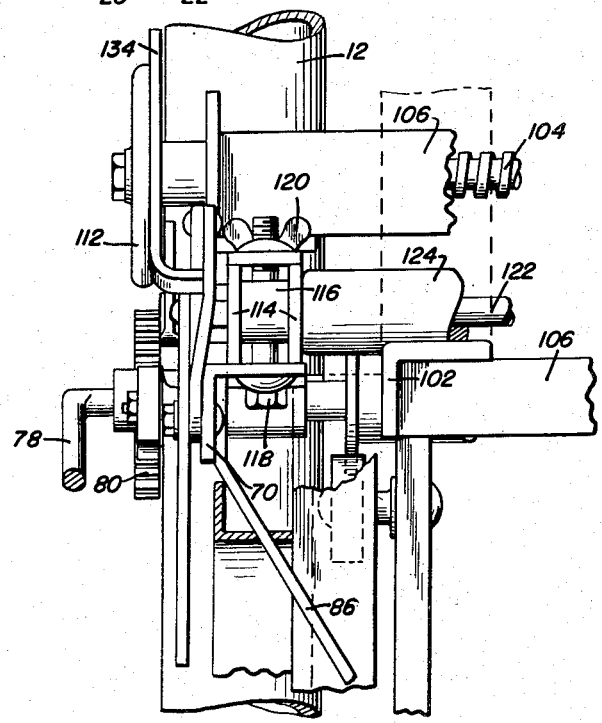
Figure 5:
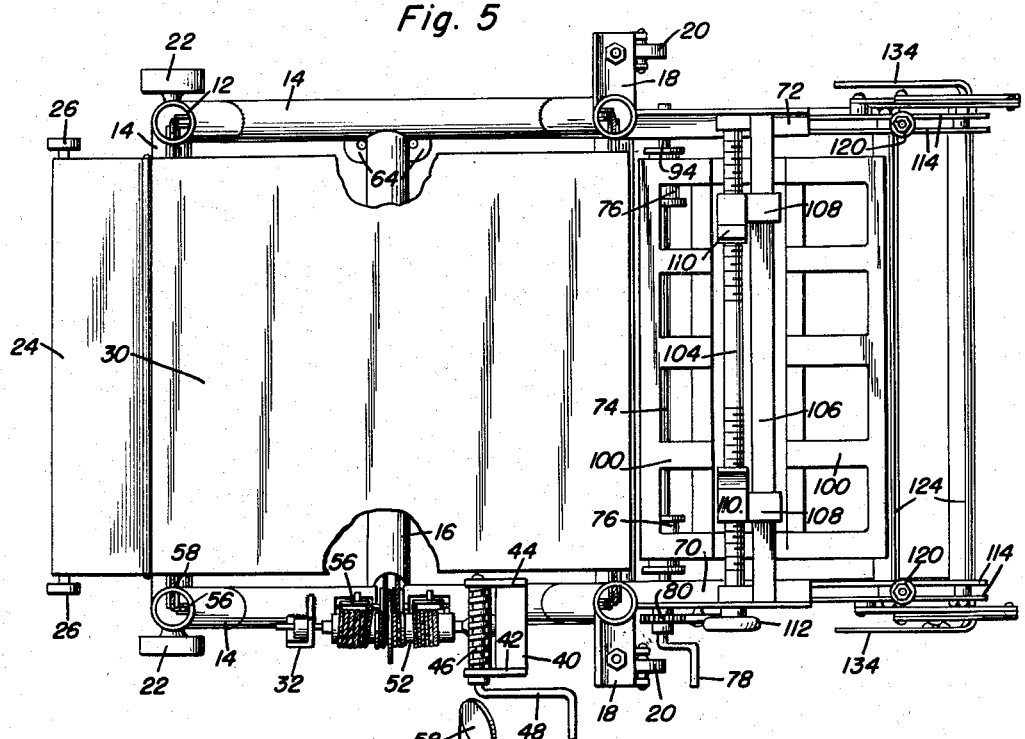
Figure 5 is a top plan view of the device with parts thereof being broken away to show other parts in greater detail.
Figure 6:
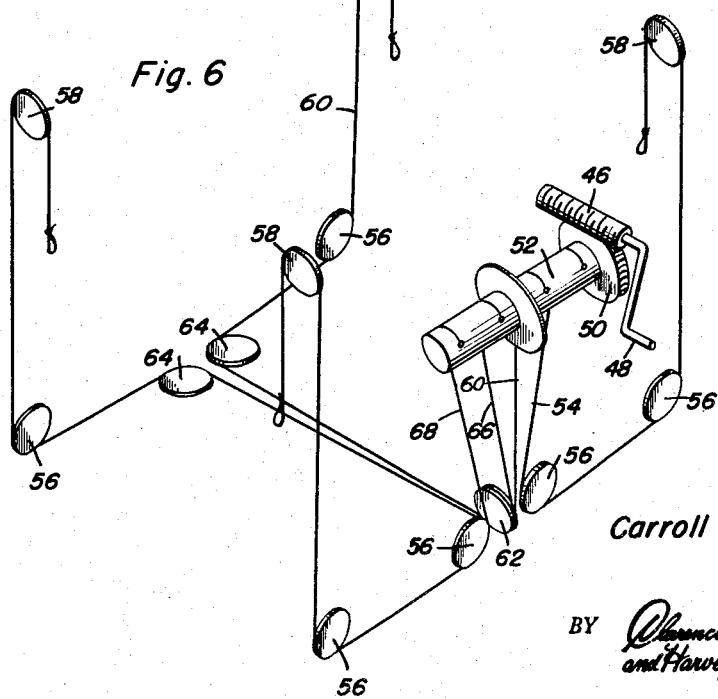
Figure 6 is a schematic diagram of the lifting mechanism for the elevator platform comprising one element of the present invention.

Figure 7 is an elevational detail of a portion of the invention but shows in greater detail the means for adjusting a grinder into operative position in engagement with the cutting blades of the lawn mower; and Figure 8 is an enlarged side elevational detail of a portion of the machine used in positioning the lawn mower upon a suitable positioning device preparatory to engagement by the grinding mechanism.

With continuing reference to the accompanying drawings wherein like reference numerals designate similar parts throughout the various views, reference numeral 10 generally designates a lawn mower lift which comprises four upwardly extending tubular frame members 12 which are interconnected by horizontal frame members 14 at the bottom ends of the frame members 12. A further horizontal transverse frame member formed of a tubular element which is indicated as at 16 extends between opposed tubular frame members 14. By means of suitable angle irons 18, casters 20 are secured to the frame members 14 and other wheels 22 are journaled on shafts extending from the frame elements.

A ramp 24 is provided with wheels 26 and is supported by a suitable lift platform 30 and enables a lawn mower such as that designated at 28 to be raised onto the lift platform 30 supported by the frame members 12. Extending upwardly from one of the side frame members 14 are angle iron supporting members 32 and 34 which are braced by means of members 36 and 38. Supported on the angle iron member 34 is a plate 40 to which there is secured brackets 42 and 44 in which a worm 46 is journaled. A crank 48 is provided for rotating the worm 46 which, in turn, drives gear 50 and hence drum 52 on which there are wound cables for raising and lowering the platform 30.

The cable for raising the platform 30 consists of a first cable as indicated at 54 which is engaged about vertically mounted pulleys supported by the frame members 14, as indicated at 56 and about a vertically extended pulley 58 supported by one of the frame members 12. Thence the cable 54 is secured to the platform. A second cable 60 is secured about pulley 62 and one of the horizontally supported pulleys 64 each secured in a cut-out portion in the transverse frame member 16 and thence about complementary pulley 56 and another pulley as indicated at 58 similar to the pulleys on which the cable 54 is secured. Likewise, cable 66 is engaged about pulleys 62, 64, 56 and 58 and then secured to the platform. Cable 68 is complementary to cable 54 and is secured about some of the pulleys 56 and 58 before being secured to the platform 30.

It is to be noticed that as the crank is rotated, the platform 30 and the ramp 24 are raised and the mower which has been guided on to the platform 30 when the platform and the ramp was in its lowermost position is lifted.

Extending outwardly from a pair of the frame members 12 are angle iron members 70 and 72. Secured on a shaft 74 extending between the angle iron members 70 and 72 are drums 76 which are rotated by means of handle 78. The shaft 74 is held in a set position by means of the ratchet wheel stop mechanism as indicated at 80. Secured to the drums 76 are cables 82 which are connected to crank arms 84 the other ends of which are pivotally attached to members 86 extending downwardly from the angle irons 70 and 72.

By means of pins 87 engaged in slots 88 in the crank arms 84 the crank arms are connected to guides 90 slidingly mounted by means of wheels 92 in channel members 94 depending from the angle iron members 70 and 72. The guide means 90 are secured to a transverse bar 96 which has welded thereto U-shaped frame members 98 of the platform generally indicated at 100. Hence, by rotation of the shaft 74 and of the crank handle 78 the platform 100 may be raised or lowered as desired.

Journaled in and between a pair of members 102 which are welded to the frame members 12 is a threaded shaft 104. Extending between the members 102 is a guide bar 106 about which extensions 108 of support members 110 are positioned. The support members 110 are threadedly engaged by the threaded shaft 104 and hence, upon rotation of the disked handle 112 the support members 110 may be readily adjusted transverse of the machine in order to engage the side portions 111 of the mower to support the lawn mower 28 transversely of the lift 10.

There is mounted on each of the angle iron members 70 and 72 for sliding motion relative thereto a pair of guide bars 114 which are held in spaced relationship by spacers 116 and which are selectively secured to the angle iron members 70 and 72 by means of bolts 118 which extend through openings in the angle iron members 70 and 72 and between each pair of guide bars 114 and which are held so in position by means of wing nuts 120. Extending between the guides 114 are shafts 122 on which sleeves 124 are disposed. Engaged on the sleeves 124 for sliding motion relative thereto are brackets 126 which are secured to a plate 127 on which is supported a prime mover 128 and a grinding wheel 130 driven by the prime mover 128 and drivingly connected thereto by a belt means. In order to advance the guides 114 and hence the grinder 130 into engagement with the cutting blades of the lawn mower 28 there are provided links 132 which are pivotally attached to the angle irons 70 and 72. Handles 134 are welded to the links 132 and are used to actuate the links 132. A connecting link 136 joins each of the links 132 with the members 114. Additionally a link 138 is pivotally secured at one end thereof to a connecting link 136 and is provided with a slot 140 in which the shaft 142 pivotally attaching the links 132 to the angle irons 70 and 72 may ride. Hence, upon movement of the handle 134 or an auxiliary handle 144, that is fixed to connecting link 136, the grinder 130 may be moved into engagement with the cutting edges of the lawn mower 28.

In operation, the lawn mower is directed up the ramp 24 onto the platform 30. Then, the crank arm 48 is actuated which causes the platform 30 to be raised to a position level with the uppermost position of the platform 100. The lawn mower 28 is then pushed onto the platform 100 and the supporting members 110 are positioned by means of the crank wheel 112. Then, the platform 100 is lowered by means of the mechanism operated by crank handle 78 so that the supporting members 110 will engage and support the side portions 111 of the lawn mower 28, and the platform 30, which is then supporting the rear ground engaging roller of the lawn mower 28, is lowered somewhat as is best shown in Figure 3 to tilt the lawn mower at a desired angle in order that the grinder 130 may be brought into engagement with the cutting blades at a desired angle. Then, the guide strips 114 and hence the sleeves 124 may be brought into position and the grinder brought into engagement with the cutting blades of the lawn mower 28.

Since from the foregoing the construction and arrangement of this lawn mower lift are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

Having described the invention, what is claimed as new is:

1. A device for sharpening a lawn mower, said device comprising a wheeled supporting frame, a first vertically movable horizontal platform carried by the frame, means mounted on the frame and connected to the platform for selectively raising and lowering the platform, a second vertically movable horizontally disposed platform slidably supported by the frame at one side of the first platform, means operatively connected to the second platform for selectively raising and lowering the second platform, means mounted on the frame for engaging and supporting a lawn mower moved onto the second platform from the first platform, a carriage slidably carried by the frame and movable toward and away from the second platform and toward and away from a lawn mower supported on the second platform, and a grinding wheel supporting plate slidably supported on the carriage and movable in a horizontal path perpendicular to the sliding path of the carriage.

2. The combination of claim 1 and a ramp having an upper end pivotally secured to said first platform and floor contacting rollers at the lower end of the ramp adapted to engage a floor surface when the first platform is lower to permit the lower end of the ramp to move away from the frame, whereby a lawn mover may be moved onto the first platform.

3. The combination of claim 1 wherein said second platform includes a carriage having wheels, and vertical channel shaped guides forming part of said frame and slidably receiving said rollers.

4. A machine for sharpening lawn mowers comprising a supporting frame including two pair of interconnected uprights and a pair of horizontal members secured to and projecting laterally from a pair of said uprights, vertical channel members fixed to and depending from said horizontal members, a carriage including wheels tracking in said channel members, a platform supported on the carriage and movable vertically with the carriage, means supported on the horizontal members and connected to the carriage for selectively raising and lowering the latter, a second platform confined between said uprights and movable vertically alongside of the first mentioned platform, means supported on the frame and operatively connected to the second platform for selectively raising and lowering the latter, and a blade sharpening means supported on said horizontal members and movable selectively toward and away from the blade of a mower moved onto the first named platform from the second platform, said second platform being raised with a mower thereon until the second platform is substantially flush with the first named platform, whereby the ground wheels of the mower may be moved onto the first named platform with the guide wheel of the mower remaining on the second platform, said second platform being lowered after the ground wheels of the mower have been moved onto the first named platform in order to tilt the mower and permit the sharpening means to be moved into engagement with the blade of the mower, said blade sharpening means including a horizontally slidable carriage movable selectively toward and away from said second platform and a grinding wheel supporting plate slidably supported on the horizontally slidable carriage and movable perpendicular to the path of movement of the horizontally slidable carriage, and means operatively connecting the horizontally slidable carriage to the horizontal members for moving the carriage selectively toward and away from said second platform.

5. A device for sharpening a lawn mower, said device comprising a supporting frame including corner uprights and an overhang fixedly secured to two of the uprights, a first vertically movable horizontal platform carried by the frame, a second vertically movable horizontally disposed platform slidably carried by the overhang and adapted to receive a lawn mower from the first platform, means on the frame operatively connected to the first platform for selectively raising and lowering the first platform, additional means on the overhang operatively connected to the second platform for selectively raising and lowering the second platform, means supported on said overhang for engaging and holding a lawn mower relative to the second platform, and a grinding wheel mount slidably carried by the overhang and selectively movable toward and away from the second platform.

6. The combination of claim 5 wherein said first platform is substantially rectangular to include four corners, said raising and lowering means for said first platform including a horizontally disposed cable drum rotatably supported by the supporting frame, and a cable between the drum and each corner of the first platform.

7. The combination of claim 5 wherein said first platform is substantially rectangular to include four corners, said raising and lowering means for said platform including a horizontally disposed cable drum rotatably supported by the supporting frame, cables terminally attached to said drum and the corners of said first platform, there being one cable connecting the drum to each corner of the first platform, said uprights being tubular and receiving said cables, said frame including a pair of tubular side members and a tubular transverse member joining said side members, upper and lower pulleys carried by each of the uprights, further pulleys carried by the side members, two of said cables extending through one of said side members and through two of said uprights and engaged with the pulleys carried by said one of said side members and said one of said uprights, another pulley carried by the transverse member, the remaining two cables extending through said transverse member and the remaining two uprights and being engaged with the pulleys thereby.

8. A device for sharpening a lawn mower, said device comprising a supporting frame including corner uprights and an overhang fixedly secured to two of the uprights, a first vertically movable horizontal platform carried by the frame, a second vertically movable horizontally disposed platform slidably carried by the overhang and adapted to receive a lawn mower from the first platform, means on the frame operatively connected to the first platform for selectively raising and lowering the first platform, additional means on the overhang operatively connected to the second platform for selectively raising and lowering the second platform, means supported on said overhang for engaging and holding a lawn mower relative to the second platform, said lawn mower engaging and holding means including a horizontal rod rotatably supported by said overhang and having oppositely threaded end portions, and support members extending upwardly from said rod and having threaded bores accommodating the ends of said rod.

CARROLL W. BRUFFEY.

References Cited in the file of this patent

UNITED STATES PATENTS

| Number | Name | Date |
|---|---|---|
| 1,545,426 | Hoffmann | July 7, 1925 |
| 1,605,890 | Brown | Nov. 2, 1926 |
| 1,667,467 | Young | Apr. 24, 1928 |
| 1,916,063 | Miller | June 27, 1933 |
| 1,950,936 | Baumberger | Mar. 13, 1934 |
| 2,149,774 | Ingleman | Mar. 7, 1939 |
| 2,180,911 | Rogers | Nov. 21, 1939 |
| 2,233,055 | Kennedy | Feb. 25, 1941 |
| 2,279,798 | Shelburne | Apr. 14, 1942 |
| 2,382,311 | Heald | Aug. 14, 1945 |
| 2,432,851 | Anderson | Dec. 16, 1947 |
| 2,493,619 | Comstock | Jan. 3, 1950 |
| 2,533,009 | Harsh | Dec. 5, 1950 |
| 2,573,587 | McGraw | Oct. 30, 1951 |